C. F. MacGILL.
RECORDING DEVICE FOR SPEEDOMETERS AND OTHER PURPOSES.
APPLICATION FILED JULY 26, 1917.

1,278,964.

Patented Sept. 17, 1918.

Inventor
Charles F. MacGill
by Geo. N. Goddard
Atty.

UNITED STATES PATENT OFFICE.

CHARLES FREDERICK MacGILL, OF CAMBRIDGE, MASSACHUSETTS.

RECORDING DEVICE FOR SPEEDOMETERS AND OTHER PURPOSES.

1,278,964.	Specification of Letters Patent.	Patented Sept. 17, 1918.

Application filed July 26, 1917. Serial No. 182,921.

*To all whom it may concern:*

Be it known that I, CHARLES F. MACGILL, citizen of the United States, and resident of Cambridge, Massachusetts, have invented certain new and useful Improvements in Recording Devices for Speedometers and Other Purposes, of which the following is a specification.

This invention relates to recording devices and in its present application has particular relation to the recording on a time chart of the fluctuating or varying speeds of a motor car or other movable mechanism by which a complete and graphic record of speed variations may be made to cover any given interval of time whether of long or short duration.

The invention comprises essentially a traveling chart properly ruled or marked to indicate time intervals and speed intervals up to the limit of practical speed requirements combined with the terminals of a spark coil so arranged that the spark discharge produces a series of perforations through the chart and means coördinated with a speedometer for shifting the point of spark discharge according to the speed-indicating position of the speedometer so that at any given instant the location of the spark discharge through the chart will correspond to the speed-indicating position of the speedometer, whereby an irregular line of perforations corresponding to the fluctuations in the speed of the car are produced on the spaced speed chart. More specific features of the improvement will be explained in detail in the specification and will be defined in the claims annexed hereto.

In the accompanying drawings I have illustrated a simple arrangement embodying the principles of this invention, in which—

Figure 1:
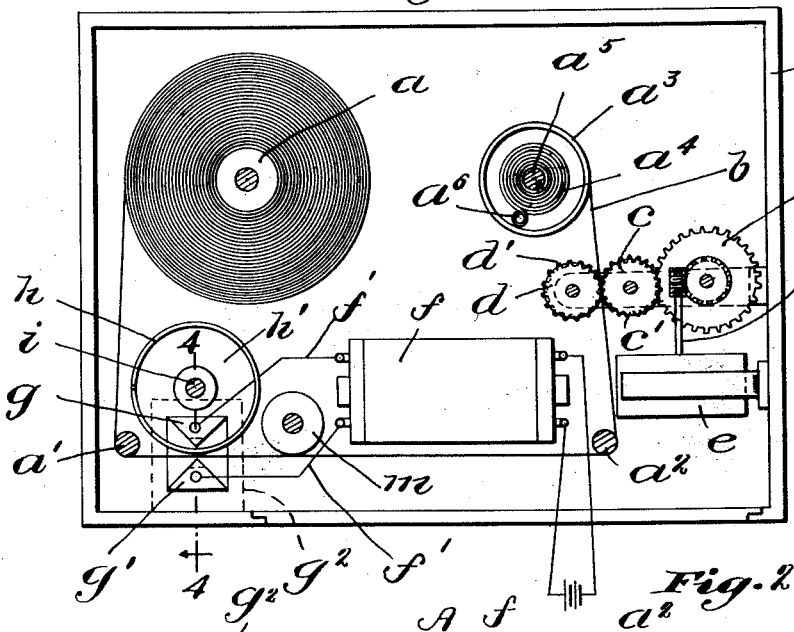
Figure 1 is a plan view of the speed-recording mechanism, the top of the casing being removed.
Figure 3:
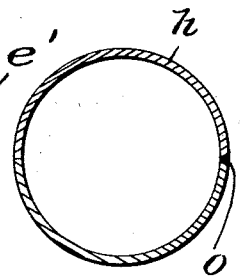
Fig. 3 is a cross-section through the spark-controlling element or cylinder.
Figure 2:
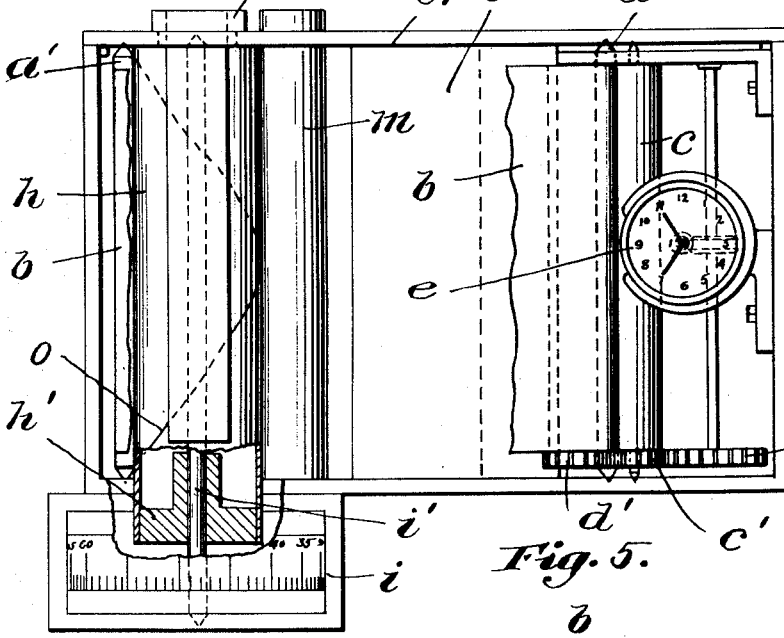
Fig. 2 is a side elevation, the front of the casing being removed.
Figure 4:
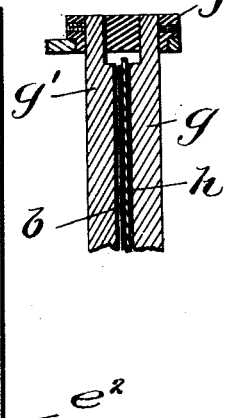
Fig. 4 is a detail in elevation showing the manner of supporting the spark terminals.
Figure 5:
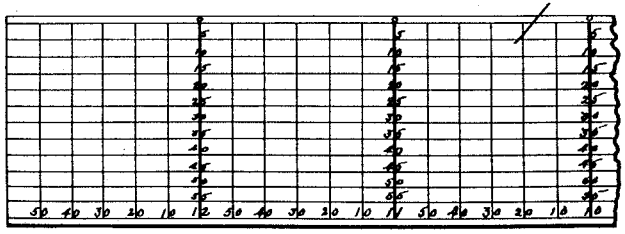
Fig. 5 is an elevation of the speed-recording card or chart.

In the practice of this invention I may employ any suitable mechanism for feeding the speed-recording strip or chart at a uniform rate during the period the device is in use. The speed strip or chart herein shown comprises an elongated strip of paper or other suitable material having transverse lines spaced equally apart and dividing the strip longitudinally into time intervals of any convenient duration. In this case as shown in Fig. 5 the heavy vertical lines indicate the even hours while the lighter vertical lines between are separated by intervals indicating ten minutes duration which means that the chart travels a distance equal to the narrower longitudinal spaces every ten minutes.

By the longitudinal lines the chart is divided transversely into spaces or intervals beginning with zero at the top and running up to 55 miles by means of 5 mile spaces or intervals to indicate the speed mileage.

The speed chart or strip may be of any length approximately to cover any desired period of time. It is rolled up or coiled on a drum or arbor $a$ mounted vertically inside the casing A whence it is carried over suitable guides $a'$, $a^2$ to the winding drum $a^3$. The winding drum may be actuated in any suitable manner as by means of a coiled spring $a^4$ similar to a clock spring, one end of which is secured to the arbor $a^5$ of the winding-on drum, while the other end is secured to a fixed pin $a^6$ in the bottom of the casing. It should be understood that this coiled spring acts merely as a take-up device for taking up the slack of the time strip while the actual control or feed of the time strip is effected by clock-controlled means.

The clock-controlled means for feeding the chart $b$ comprises a pair of drums or rollers $c$, $d$, interconnected by intermeshing pinions $c'$, $d'$ and having their cylindrical surfaces covered with any suitable friction material such as rubber and set closely together to pinch or grip the chart between them. An ordinary clock-work $e$ is operatively connected to drive these feed rolls at the proper sped to feed the chart in correspondence with time intervals marked thereon. In this case I have shown connected with the clock $e$ a rearwardly extending arbor $e'$ operatively connected by means of a worm and worm gear with a pinion element or gear $e^2$ which meshes with the pinion $c'$ in order to rotate the same. The intermeshing of the pinion $c'$ with the pinion $d'$ serves to transmit motion to the coöperating drum or roll $d$ so as to secure uniform surface speed of both feed rolls which grip and advance the chart at a uniform rate.

At any convenient point, preferably inside the casing, is mounted an electric spark coil $f$ and from this spark coil are led the connecting wires $f'$ which electrically connect the secondary element of the coil with two vertical terminals $g, g'$ which are suspended from an insulating support or block $g^2$ carried by the cover so as to have their opposing vertical edges in close proximity to permit the discharge of the spark between the opposing adjacent edges.

The terminals, $g, g'$ are spaced apart a sufficient distance to allow the interposition of the speed indicating chart $b$ and of a hollow drum $h$, which, as will now be explained, acts to shift or vary the point of spark discharge transversely to the direction of travel of the chart.

The means for controlling the point of spark discharge according to the form illustrated in the drawings, comprises a hollow cylinder $h$ made of mica or other di-electric material carried by a spider $h'$ and arranged close to the path of travel of the time chart, and between the two spark-coiled terminals $g, g'$. It is preferred that this cylinder should not touch either of the terminals or the speed chart in order that frictional resistance to its rotation in either direction may be reduced to a minimum. The spider $h'$ which carries the hollow drum is secured to the shaft $i'$ of any ordinary or suitable type of speedometer which shaft is extended upward a sufficient distance to form a rotary support for the spider and which may as shown in the drawings, be extended upward to engage an upper bearing seat formed in the cover which serves to steady the drum against lateral movement.

The mica or di-electric sheets forming the periphery of the drum are not entirely continuous in a circumferential direction but are cut away to leave a slight gap extending in a spiral or helical direction around the drum from its lower to its upper portion. I prefer to insert in this gap a thin helical metallic strip $o$ which acts to facilitate the jump of the spark from one terminal to the other through this gap in the di-electric.

It will be seen that although the electrical gap which extends spirally around the drum intersects the plane cutting the opposed adjacent edges of the spark terminals $g, g'$, there will be an opportunity for an electrical discharge or spark to jump across, while at points outside of this intersection the di-electrical material intercepts or prevents the passage of the electrical discharge or spark.

Suppose now the speedometer dial stands at the zero point; in that case the upper end of the gap in the di-electric corresponding to the level of the zero line on the chart will register with or intersect the vertical plane connecting the adjacent edges of the two spark terminals and the spark discharge will occur at this point forming a series of close perforations along the zero line so long as the speedometer remains at zero. As the speedometer shaft and dial turn to the right or in a contra-clockwise direction increasing speeds will be indicated up to the limit of the device and the spark intercepting drum will be turned in a similar direction bringing progressively lower points of the electrical gap therein into operative position between the spark terminals. Hence as the speedometer turns to indicate higher speeds the spark controlling device connected therewith turns in a similar manner to shift the spark to the corresponding level on the chart.

To make the perforated record of the speed more conspicuous or noticeable there may be provided an inking roller $m$ forming a light contact with the back or reverse face of the chart so that the ink will ooze through the fine perforations and make a series of minute ink spots forming practically a continuous line.

When the car is at rest it is immaterial whether the spark coil is in action or not. If it is in action it will simply make the line of perforations along the zero mileage line, whereas if it is cut out of operation when the car stops the absence of any perforations would, of course, indicate that the car was then at rest. The dotted line on the chart in Fig. 5 indicates the graphic speed record as actually applied to the chart.

While this recording mechanism has been described as applied to the speedometer of a motor car to leave a permanent speed indicating record it is clear that the same principle or mechanism may be applied to making a graphic chart record of the oscillations or movements of other devices for making a permanent record. The underlying principle of the invention consists in the employment of an electric spark device and a moving chart in combination with a spark shifting or spark controlling means by which the line of perforations is varied transversely of the chart, traveling to correspond with the variations in position of the device whose fluctuations it is desired to record.

What I claim is:

1. A recording mechanism for a measuring indicator embracing in combination a movable chart, an electric spark coil, two slightly separated spark terminals arranged respectively on opposite sides of the chart within sparking distance of each other, a spark localizing member mounted to move to and fro between the two terminals to shift the spark discharges transversely of the chart in correspondence with the movements of the indicator whereby variations of the position of the indicator are recorded on the chart, substantially as described.

2. A recording device for a measuring indicator embracing in its construction a traveling chart, two spark terminals arranged in juxtaposition of each other on opposite sides of the chart and extending transversely thereof, each spark terminal being constantly in circuit with an electric spark tension device to allow spark discharges at all times between opposite portions of said terminals, and a spark intercepter moved to and fro by the measuring indicator whereby the successive positions of the measuring indicator are recorded on the traveling chart, substantially as described.

3. The combination with a traveling time indicating chart, of a spark coil, two spark terminals arranged in juxtaposition on opposite sides of the chart, a spark intercepting device formed with a diagonal gap and arranged to move to and fro between said terminals to shift the point of spark discharge longitudinally of said terminals, said intercepting device being operatively connected with a speed indicating device whereby the position of the spark gap between said terminals is varied according to the varying movements of the speed indicating device, substantially as described.

4. The combination of a chart and a clock-controlled feeding means therefor, a spark coil, a pair of terminals electrically connected with said spark coil in close proximity to the opposite sides of the chart, an oscillatory drum of spark intercepting material arranged to move to and fro between the spark terminals and provided with a diagonal spark gap to allow the spark to pass between the terminals at the line of intersection with said spark gap, said drum being operatively connected with a speedometer to oscillate in accordance with the variations of positions of said speedometer, substantially as described.

5. The combination of a time chart, automatic devices for feeding said time chart at a uniform rate of speed, a spark device, a pair of terminals electrically connected with said spark device and arranged on opposite sides of the chart adjacent thereto in order to perforate the chart by the spark discharge, a hollow drum whose periphery is formed of di-electric material, said periphery being provided with a diagonal spark gap, a strip inserted in said spark gap, said drum being located with its periphery between said spark terminals and operatively driven by a speedometer operatively connected with said drum to coördinate the oscillation of said drum with the oscillation of the speedometer, substantially as described.

6. A chart-perforating recording device for a measuring indicator embracing in combination a spark tension device, two spark terminal members arranged within sparking distance of each other on opposite sides of a moving chart, each member being in permanent electrical connection with the spark tension device, a spark intercepter mounted to move between said spark terminals to shift the spark discharge longitudinally thereof in correspondence with the varying positions of the measuring indicator, and means for moving the chart between said terminals, substantially as described.

7. The combination with a traveling chart, a timed feeding mechanism therefor to feed the chart uniform distances during equal intervals of time, an electric spark-producing device, spark terminals electrically connected therewith in close proximity to opposite sides of the chart, a spark intercepter located between said terminals adjacent to the chart actuated by a speedometer, whereby the point of the spark discharge is shifted transversely of the chart according to the varying movements of the speedometer, substantially as described.

In witness whereof I have subscribed the above specification.

C. FREDERICK MacGILL.